United States Patent
Stanley et al.

(10) Patent No.: US 8,949,024 B2
(45) Date of Patent: Feb. 3, 2015

(54) VEHICLE LOCALIZATION USING SURFACE PENETRATING RADAR

(71) Applicant: Massachusetts Institute of Technology, Cambridge, MA (US)

(72) Inventors: Byron McCall Stanley, Cambridge, MA (US); Matthew Tyler Cornick, Woburn, MA (US); Charles Michael Coldwell, Belmont, MA (US); Jeffrey Charles Koechling, Wayland, MA (US); Beijia Zhang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 15 days.

(21) Appl. No.: 13/798,416

(22) Filed: Mar. 13, 2013

(65) Prior Publication Data

US 2014/0121964 A1    May 1, 2014

Related U.S. Application Data

(60) Provisional application No. 61/763,241, filed on Feb. 11, 2013, provisional application No. 61/718,363, filed on Oct. 25, 2012.

(51) Int. Cl.
*G01S 13/88* (2006.01)
*G05D 1/02* (2006.01)
(Continued)

(52) U.S. Cl.
CPC ............... *G05D 1/0257* (2013.01); *G01S 13/87* (2013.01); *G01S 13/06* (2013.01); *G05D 1/0268* (2013.01)
USPC ........... 701/514; 701/400; 701/408; 701/470; 701/523; 342/70; 342/76; 342/350; 340/988; 340/995.22

(58) Field of Classification Search
CPC ..... G05D 1/0257; G05D 1/0268; G05D 1/00; G01S 13/88; G01S 13/94; G01S 13/87; G01S 13/02; G01S 13/06

USPC ........... 701/1, 23, 25–28, 400, 408, 415, 423, 701/470, 514, 523; 340/935, 937, 938, 988, 340/995.22, 995.25; 342/22, 70–72, 76, 77, 342/350–385
See application file for complete search history.

(56) References Cited

U.S. PATENT DOCUMENTS 3,366,960 A * 1/1968 Gluck ........................... 342/458
4,162,509 A * 7/1979 Robertson ....................... 356/28
(Continued)

FOREIGN PATENT DOCUMENTS

| JP | 09053939 A | 2/1997 |
| JP | 2001289651 A | 10/2001 |

(Continued)

OTHER PUBLICATIONS

California Partners for Advanced Transit and Highways, "California PATH Magnetic Guidance System", University of California, Berkeley, Institute of Transportation Studies, Richmond, CA; 2 pages.

(Continued)

*Primary Examiner* — Thomas Tarcza
*Assistant Examiner* — Tyler J Lee
(74) *Attorney, Agent, or Firm* — Schmeiser, Olsen & Watts LLP; William G. Guerm

(57) ABSTRACT

Described are a method and a system for localization of a vehicle. The method includes the acquisition of SPR images of a subsurface region along a vehicle track. Acquired SPR images are compared to SPR images previously acquired for a subsurface region that at least partially overlaps the subsurface region along the vehicle track. In some embodiments, the comparison includes an image correlation procedure. Location data for the vehicle are determined based in part on location data for the SPR images previously acquired for the second subsurface region. Location data can be used to guide the vehicle along a desired path. The relatively static nature of features in the subsurface region provides the method with advantages over other sensor-based navigation systems that may be adversely affected by weather conditions, dynamic features and time-varying illumination. The method can be used in a variety of applications, including self-driving automobiles and autonomous platforms.

19 Claims, 8 Drawing Sheets

(51) Int. Cl.
*G01S 13/87* (2006.01)
*G01S 13/06* (2006.01)

(56) References Cited

U.S. PATENT DOCUMENTS

| | | | |
|---|---|---|---|
| 4,495,589 A * | 1/1985 | Hirzel | 702/144 |
| 4,671,650 A * | 6/1987 | Hirzel et al. | 356/28 |
| 5,202,692 A * | 4/1993 | Huguenin et al. | 342/179 |
| 5,485,384 A * | 1/1996 | Falconnet | 701/445 |
| 6,082,466 A * | 7/2000 | Gudat | 172/5 |
| 6,362,775 B1 * | 3/2002 | Goebel et al. | 342/64 |
| 6,370,475 B1 * | 4/2002 | Breed et al. | 701/301 |
| 6,453,223 B1 * | 9/2002 | Kelly et al. | 701/28 |
| 6,766,253 B2 * | 7/2004 | Burns et al. | 702/6 |
| 7,191,056 B2 * | 3/2007 | Costello et al. | 701/523 |
| 7,395,156 B2 * | 7/2008 | Chiou et al. | 701/301 |
| 8,207,834 B2 * | 6/2012 | Takemura et al. | 340/425.5 |
| 8,306,747 B1 * | 11/2012 | Gagarin et al. | 701/514 |
| 8,457,814 B2 * | 6/2013 | Hasegawa | 701/17 |
| 2002/0122000 A1 * | 9/2002 | Bradley et al. | 342/22 |
| 2006/0095172 A1 * | 5/2006 | Abramovitch et al. | 701/28 |
| 2010/0026555 A1 * | 2/2010 | Whittaker et al. | 342/70 |
| 2012/0026329 A1 | 2/2012 | Vorobiev | |
| 2012/0271540 A1 | 10/2012 | Miksa et al. | |

FOREIGN PATENT DOCUMENTS

| | | |
|---|---|---|
| KR | 20060087449 A | 8/2006 |
| WO | 2012/167069 A1 | 12/2012 |

OTHER PUBLICATIONS

Levinson, Jesse and Sebastian Thrun, "Robust Vehicle Localization in Urban Environments Using Probabilistic Maps", 2010 IEEE International Conference on Robotics and Automation, May 3-8, 2010, Anchorage, Alaska; 7 pages.

Hahnel, et al., "An Efficient FastSLAM Algorithm for Generating Maps of Large-Scale Cyclic Environments from Raw Laser Range Measurements", 2003 IEEE/RSJ International Conference on Intelligent Robots and Systems, Proceedings, pp. 206-211, vol. 1; 6 pages.

International Search Report & Written Opinion in related international application No. PCT/US13/30682, mailed on Dec. 16, 2013; 11 pages.

* cited by examiner

VEHICLE LOCALIZATION USING SURFACE PENETRATING RADAR

RELATED APPLICATIONS

This application claims the benefit of the earlier filing dates of U.S. Provisional Patent Application No. 61/718,363, filed Oct. 25, 2012 and titled "Method of Localization of a Vehicle Using Ground Penetrating Radar" and U.S. Provisional patent Application No. 61/763,241, filed Feb. 11, 2013 and titled "Method of Localization of a Vehicle Using Surface Penetrating Radar," the entireties of which are incorporated herein by reference.

GOVERNMENT RIGHTS IN THE INVENTION

This invention was made with government support under Grant No. FA8721-05-C-0002 awarded by the Air Force. The government has certain rights in this invention.

FIELD OF THE INVENTION

The present invention relates generally to a method and system for localization of a vehicle. More particularly, the invention relates to localization of a vehicle using surface penetrating radar and the option for using localization data for navigation of the vehicle.

BACKGROUND OF THE INVENTION

Approaches to autonomous navigation in structured environments, such as road networks, can generally be divided into two categories. In the first category, the autonomous vehicle navigates like a human, with little pre-existing knowledge of the road features beyond simple maps and general rules of the road. The second category of approaches relies on extensive prior knowledge of the environment, for example, a dense set of global positioning system (GPS) measurements marking the lane boundaries and a map of all stop signs, pedestrian crossings and the like. The first category presents a challenging approach due to the extreme variability of real-world environments. The second category approach has been evaluated, for example, by the Defense Advanced Research Project Agency (DARPA) Urban Challenge and the Google self-driving car project. Results have demonstrated that the "rich map" approach to reliable autonomous navigation in structured, well-characterized terrain may be achievable; however, one of the substantial challenges to relying on a detailed prior map is that the system must maintain precise, accurate knowledge of the vehicle location within the map.

Traditionally, GPS receivers have been used to provide global localization; however, GPS alone does not provide the precision necessary to stay within a lane of traffic. Furthermore, GPS accuracy degrades severely in environments with multipath or shadowing and the signals can easily be blocked or intentionally disrupted by others desiring to interfere with operation. GPS-based systems can be improved with differential signal algorithms or by augmenting the location estimate with inertial sensors; however, the resulting systems are typically costly and may require additional infrastructure such as base stations.

To overcome these limitations, some autonomous vehicles sense the local environment and register the sensor measurements to a map of prior observations. The success of this map-matching approach depends significantly upon the type of sensor and the locale. Passive visual methods, for example, methods employing one or more digital video cameras, perform poorly in outdoor environments due to changes in scene illumination. Variations in solar illumination angle and cloudiness may result in a system seeing a substantially different scene than the scene sensed during prior map observations. Visual sensing is another approach and is used by the Google car. Rather than relying on natural or uncontrolled illumination, the sensor transmits light, typically at frequencies that are otherwise relatively dark, and measures the intensity of the return. Algorithms are used to search for similar intensity patterns in a map of previous measurements to determine the location of the vehicle. While the active sensing approach solves the problem of inconsistent scene illumination, difficulties are encountered when the apparent scene changes significantly with weather conditions. Snow, for example, obscures important features required to match a scene to prior acquired scenes. Other weather conditions such as fog, rain and dust also impact performance. Moreover, dynamic aspects of the observed scene can create further complications. For example, the presence of other moving vehicles and the motion of typically static features due to wind gusts present significant challenges. Thus, current sensing approaches for map-based localization are not robust to common real-world conditions. Furthermore, active sensors such as those employing light detection and ranging (LIDAR) sensors generally require expensive precision-engineered electro-optical-mechanical systems.

SUMMARY

In one aspect, the invention features a method for localization of a vehicle. The method includes acquiring surface penetrating radar (SPR) images of a first subsurface region along a vehicle track. The SPR images and SPR images previously acquired for a second subsurface region that at least partially overlaps the first subsurface region are compared. Location data for the vehicle are determined based on location data for the SPR images previously acquired for the second subsurface region. In some embodiments the comparison includes performing an image correlation of the SPR images and SPR images previously acquired for the second subsurface region.

In another aspect, the invention features a method for guidance of a vehicle. The method includes acquiring SPR images of a first subsurface region along a vehicle track. The SPR images and SPR images previously acquired for a second subsurface region that at least partially overlaps the first subsurface region are compared. Location data for the vehicle are determined based on location data for the SPR images previously acquired for the second subsurface region and the vehicle is guided in response to the location data.

In another aspect, the invention features a vehicle navigation system. The system includes a mobile SPR, a radar processor, a registration module and a control module. The mobile SPR is configured for attachment to a vehicle and has an array of antenna elements each configured to transmit a radar signal into a first subsurface region and to receive a return radar signal from the first subsurface region. The radar processor is in communication with the mobile SPR system and is configured to generate SPR images of the first subsurface region. The registration module is in communication with the radar processor and is configured to receive SPR images of the first subsurface region. The registration module determines location data for the vehicle based on location data for previously acquired SPR images for a second subsurface region that overlaps at least a portion of the first subsurface region. The control module is in communication with the registration module and is configured to generate one or more control signals to guide the movement of the vehicle in response to the location data.

In another aspect, the invention features a method for localization of a vehicle. The method includes acquiring, from a first SPR system fixed in position relative to a vehicle, a first plurality of SPR images of a subsurface region along a vehicle track. A second plurality of SPR images of at least a portion of the subsurface region along the vehicle track is acquired form a second SPR system fixed in position relative to the vehicle. The SPR images from the first SPR system and the SPR images from the second SPR system are compared to determine location data for the vehicle.

In yet another aspect, the invention features a system for determining location data for a vehicle. The system includes a first and a second mobile SPR system, a first and a second radar processor, and a registration module. The first mobile SPR system configured to be fixed in a first position relative to a vehicle and having an array of antenna elements each configured to transmit a radar signal into a subsurface region and to receive a return radar signal from the subsurface region. The first radar processor is in communication with the first mobile SPR system and is configured to generate a SPR image of the subsurface region. The second mobile SPR system is configured to be fixed in a second position relative to the vehicle and separated from the first mobile SPR system. The Second mobile SPR system has an array of antenna elements each configured to transmit a radar signal into the subsurface region and to receive a return radar signal from the subsurface region. The second radar processor is in communication with the second mobile SPR system and is configured to generate a SPR image of the subsurface region. The registration module is configured to receive SPR images from the first and second radar processors, and to determine location data for the second mobile SPR system relative to the first mobile SPR system as the vehicle moves along a vehicle track.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1A:
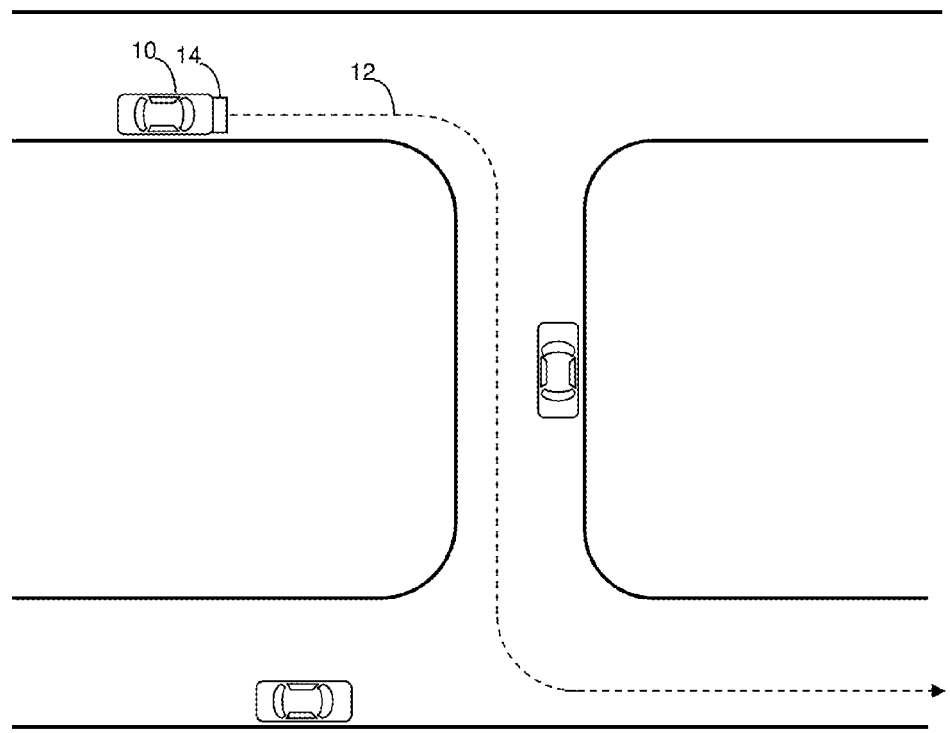
FIG. 1A illustrates a vehicle traveling within a road network according to a predetermined trip path.

Reference is made in various embodiments described below to ground and to an underground region below the surface of the ground. It will be understood that the ground includes soil, road surface or pavement such as asphalt and concrete layers, gravel, sand and the like, and that the surface of the ground is the interface of the ground with the air, array, fluid or free space. In some instances, the surface may also include the surfaces that surround a tunnel, mineshaft and other passageways through which a vehicle may travel.

More generally, reference is made herein to surface penetrating radar (SPR) and ground penetrating radar (GPR). As used herein, SPR means any radar system that is configured to acquired data from a subsurface region. A SPR can be configured and oriented to obtain data for a subsurface region that is behind the surface of a wall, ceiling, floor or the surface surrounding a tunnel or passageway. In some instances the SPR can also obtain data for the surface. It will be recognized that a GPR system is a type of SPR system which is configured to acquire data from a region below the surface of the ground and may also acquire data for the surface of the ground. A subsurface region, as used herein, means a region behind the surface such as an underground region behind the ground surface. Alternatively, the subsurface region can be a region behind a surface of a structure, such as a region inside and/or behind a wall or ceiling structure.

In brief overview, the invention relates to a method and a system for localization of a vehicle. The method includes the acquisition of SPR images of a subsurface region along a vehicle track. The SPR images are compared to SPR images previously acquired for a subsurface region that at least partially overlaps the subsurface region along the vehicle track. Location data for the vehicle are determined based in part on location data for the SPR images previously acquired for the second subsurface region.

Although described below primarily for autonomous ground vehicle navigation, the method is useful for all applications in which high accuracy vehicle localization data is desired. Moreover, the vehicle is not limited to automobiles and other forms of surface vehicles traveling on land, but instead may be a vehicle capable of navigation on water, underwater or by flight.

The relatively static nature of features in the subsurface region provides the method with advantages over other sensor-based navigation systems. For example, other systems typically exhibit degraded performance in inclement weather conditions (e.g., fog, rain and snow), in dynamic environments in which other vehicles and moving objects are present, and in environments with time-varying illumination or where dust or mud is present. Moreover, the method does not require modification of the environment although in optional embodiments markers to generate easily detectable features in SPR return signals can be employed to improve global location determination. The method can be used in a variety of applications, including self-driving automobiles and autonomous platforms (e.g., robots) operating in hazardous or remote environments. In some embodiments, the localization estimates are accurate to 2 cm rms, thereby enabling the localization estimates to be used for strict tolerance vehicle control such as maintaining a vehicle within an established lane of a highway or street.

FIG. 1A depicts a vehicle 10 traveling within a road network according to a predetermined "trip path" (dotted line) 12 in accordance with various embodiments of the invention. The trip path 12 represents the desired path of the vehicle 10 in space and optionally in time. Predefined path segments may be combined to create the desired trip path 12. The portion of the trip path 12 in FIG. 1A includes a right turn followed by a left turn. Though the trip path 12 is shown within a conventional road network, it should be appreciated that a trip path is not limited to defined pathways such as streets, roads, highways and the like, and in some instances the trip path may be across open terrain.

Although depicted as an automobile, the vehicle 10 can be any mobile platform or structure, including by way of non-limiting examples, platforms for transporting passengers or payloads such as equipment, sensors and other objects. The vehicle 10 has the capability to change direction (i.e., steer), accelerate and decelerate. Although the vehicle 10 in the illustration is generally understood to be non-holonomic as its controllable degrees of freedom are less than the total degrees of freedom, a holonomic vehicle, such as a vehicle with omnidirectional wheels, is also contemplated. In other embodiments, the vehicle 10 is capable of changing one or more of its altitude (or distance from the surface of the ground), pitch, yaw and roll. The vehicle 10 includes a GPR-based navigation system and is operated in an autonomous mode, that is, passenger operation of the vehicle 10 is limited or absent, and there are no remote commands received by the vehicle 10 for navigation. By way of an example, limited operation may include control of the speed by a passenger while other operations remain under autonomous control.

Figure 1B:
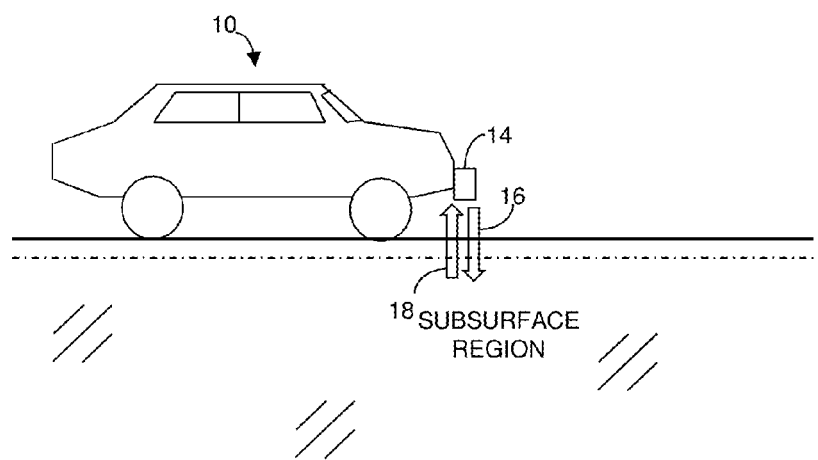
FIG. 1B shows a side view of the vehicle of FIG. 1A.

FIG. 1B shows a side view of the vehicle 10. The navigation system includes a GPR antenna array 14 fixed to the front of the vehicle. In the illustrated embodiment, the GPR antenna array 14 includes a linear configuration of spatially-invariant transmit and receive antenna elements for transmitting radar signals. In other embodiments, the GPR antenna array 14 may be located elsewhere on the vehicle 12 and the transmit and receive antenna elements are not required to be linearly arranged. The linear array 14 is nominally parallel to the ground surface and extends perpendicular to the direction of travel. In alternative configurations the GPR antenna array 14 may be closer to or in contact with the surface of the ground or road. GPR signals 16 propagate downward from the transmitting antenna elements through the road surface in front of the vehicle and into the subsurface region. GPR signals 18 backscattered in an upward direction are detected by the receiving antenna elements.

Figure 2:
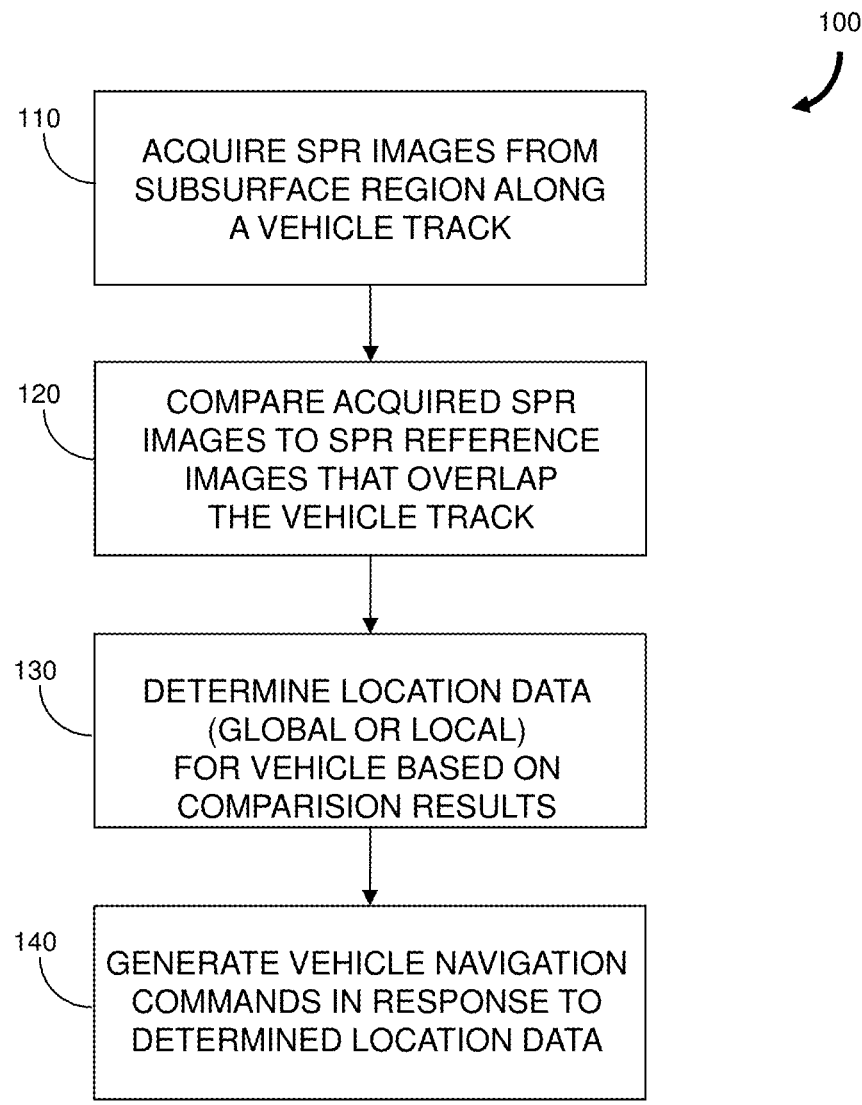
FIG. 2 is a flowchart representation of an embodiment of a method for localization of a vehicle in accordance with the invention.

Referring also to FIG. 2, a flowchart of a method 100 for localization of a vehicle in accordance with an embodiment of the invention is shown. The method 100 includes acquiring (step 110) SPR images (e.g., GPR images) from a subsurface region along the track of the vehicle 10. The SPR images are compared (step 120) to SPR reference images that were previously acquired and stored for subsurface regions that at least partially overlap the subsurface regions for the defined trip path 12. It should be noted that the SPR system for the vehicle that is used to acquire images of the subsurface region along the vehicle track need not be the same as the SPR system used to obtain the SPR reference images that were previously acquired, stored and used in the comparison. For example, the SPR antenna array and other components of the vehicle SPR system may be substantially less expensive and have different performance characteristics compared to a SPR system employed to acquire the SPR reference images. Moreover, the track of the SPR system may differ from the vehicle track during operation, for example, due to the particular location of the SPR system as mounted or attached to the vehicle 10. Thus it should be understood that the SPR images acquired along a vehicle track can be offset accordingly.

In some embodiments the SPR images also include surface data, i.e., data for the interface of the subsurface region with air or the local environment. If the SPR antenna array is not in contact with the surface, the strongest return signal received is typically based on the reflection caused by the surface. In some instances, the variation in surface topography can benefit the comparison performed in step 120.

The location of the vehicle 10 is determined (step 130) based on the comparison. The location data may be either global or local (e.g., data relative to a prior track of a vehicle). Optionally, the vehicle location data are used to generate (step 140) vehicle navigation commands. More specifically, the velocity, acceleration, orientation, angular velocity and angular acceleration of the vehicle may be continuously controlled via the vehicle navigation commands to maintain the vehicle 10 at the desired position along the trip path 12. In some embodiments, the location data for the vehicle are used in combination with data provided by one or more other sensor or navigation systems to guide the vehicle 10. Such sensor and navigation systems include, by way of examples, an inertial navigation system (INS), a GPS, a sound navigation and ranging (SONAR) system, a LIDAR system, a camera, an inertial measurement unit (IMU) and an auxiliary radar system.

Figure 3:
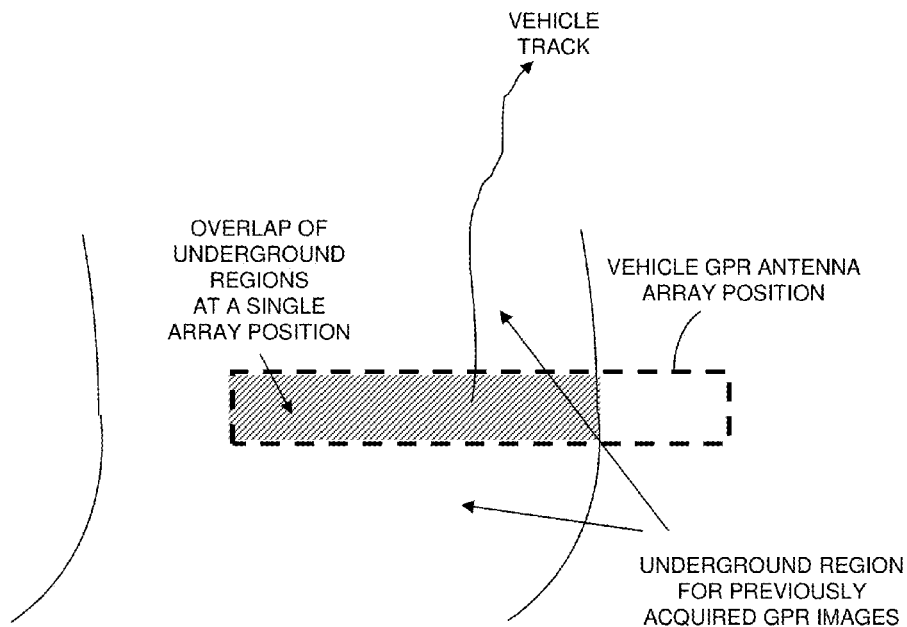
FIG. 3 graphically depicts the movement of a GPR antenna array along a vehicle track relative to an underground region for which previously acquired GPR image data are available.

FIG. 3 depicts the movement of the GPR antenna array along a vehicle track relative to a subsurface (underground) region for which GPR reference images exist. The shaded region indicates the partial overlap of the subsurface region for the GPR reference images and the subsurface region for newly acquired GPR images for the vehicle for one position of the vehicle GPR antenna array. As illustrated, the subsurface region for the GPR reference images corresponds to a curved track of a reference vehicle that acquired the reference images although it should be recognized that reference GPR images can be acquired using multiple measurement paths and combined for greater geographical coverage. Due to the limited accuracy of GPS data, the track traversed by the vehicle typically deviates from the selected trip path as defined according to GPS coordinate data. Commands generated by an autonomous vehicle navigation system, described in more detail below, are used to affect a vehicle path change to reduce or minimize the differences between the vehicle track and the selected trip path. In addition, the speed of the vehicle can be modified along segments of the trip path to maintain safe operation, to accommodate speed limits and to achieve a desired completion time for traversing the trip path.

Figure 5:
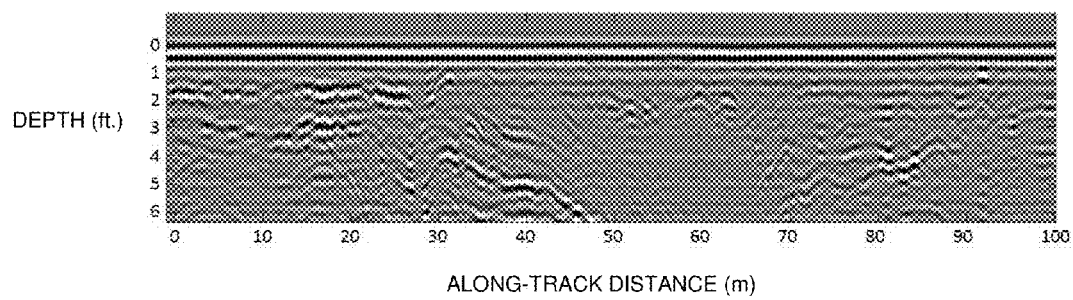
FIG. 5 shows an example of a slice of a SPR image acquired during travel along a segment of a vehicle track.
Figure 4:
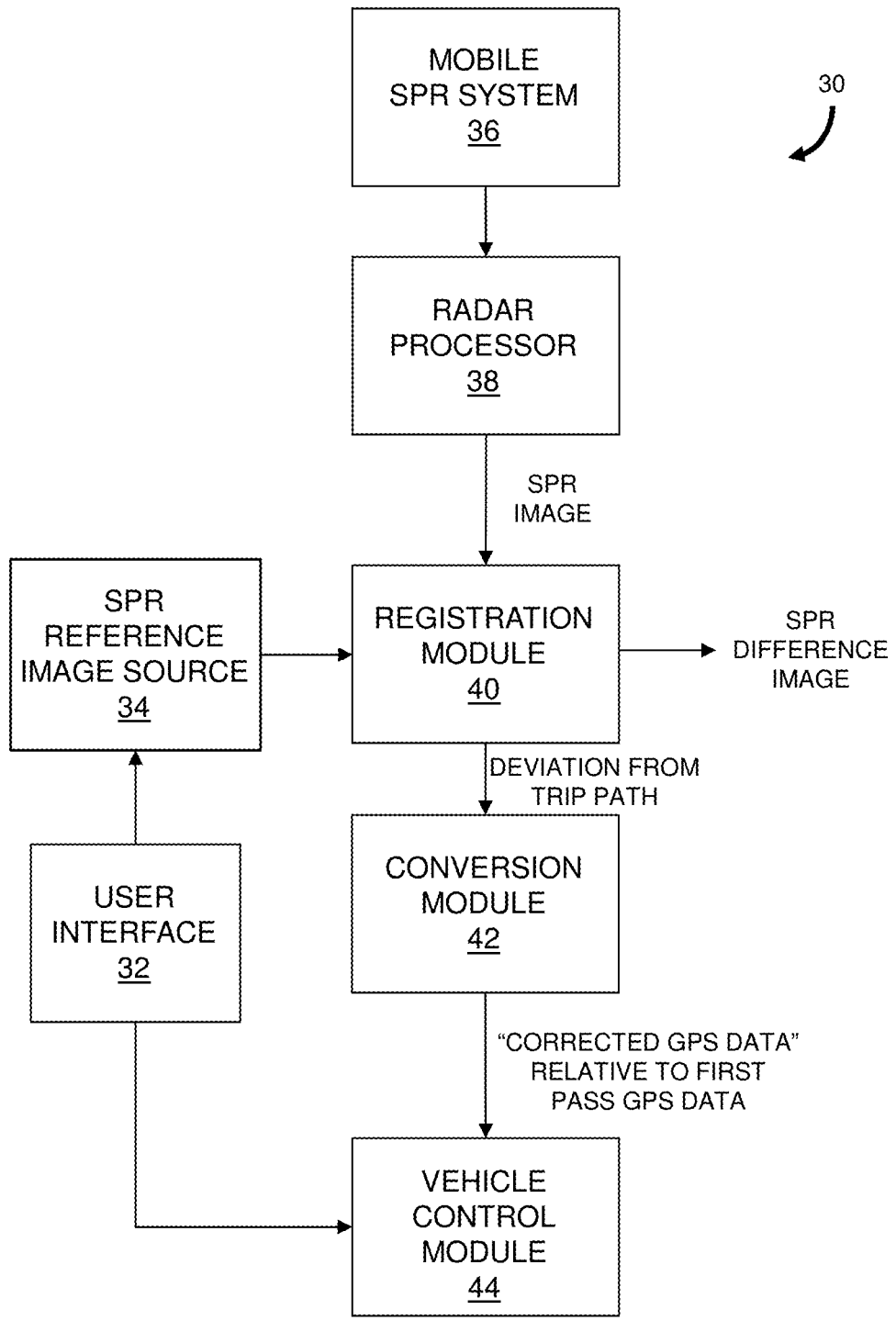
FIG. 4 is a block diagram of an embodiment of a navigation system used for autonomous operation of a vehicle according to the invention.

FIG. 4 is a block diagram of an embodiment of a navigation system 30 that can be used to operate a vehicle autonomously, such as according to the method 100 of FIG. 2. The navigation system 30 includes a user interface 32 through which a user can enter data to define the trip path or select a predefined trip path. In some embodiments the user interface 32 is part of a navigation module that displays inquiries to a user and accepts input describing where the user wants to go and what route to follow. SPR images are retrieved from a SPR reference image source 34 according to the trip path. In some embodiments the SPR image data are automatically retrieved based on the current location regardless of the selected trip path. The SPR reference image source 34 can be local or remote to the system 30. Alternatively, a combination of local and remote sources is used. The mobile navigation system also includes a mobile SPR system 36 having a SPR antenna array. The transmit operation of the mobile SPR system 36 is controlled by a radar processor 38 which also receives the return radar signals provided by the SPR antenna array. The radar processor 38 generates SPR images of the subsurface region below the road surface underneath the SPR antenna array. FIG. 5 shows an example of a slice of a SPR image acquired during travel along a segment of the vehicle track. The horizontal axis indicates distance along the vehicle track and the vertical axis indicates depth below the ground surface. The underground region depicted in the image corresponds to a single antenna channel and has a cross-track resolution determined according to the spacing of the antenna elements. SPR voltage data are represented in the figure according to a gray scale. The SPR image includes features representative of structure and objects within the subsurface region, such as rocks, roots, boulders, pipes, voids and soil layering, and other features indicative of variations in the soil or material properties in the subsurface region.

Referring back to FIG. 4, a registration module 40 compares the SPR images provided by the radar processor 38 to the SPR images retrieved from the SPR reference image source 34 so that the offset of the vehicle with respect to the closest point on the trip path is determined. U.S. patent application Ser. No. 13/221,233, titled "Mobile Coherent Change Detection Ground Penetrating Radar" and incorporated by reference herein, discloses a mobile system that includes a GPR system, a radar processor and a registration module that may be used as part of the navigation system 30. SPR images acquired for the vehicle are spatially registered to the previously acquired SPR images that overlap the trip path. In various embodiments of the present invention, offset data, or positional error data, determined in the registration process are provided to a conversion module 42 which generates GPS data corrected for the vehicle positional deviation from the trip path. The corrected GPS data are provided to a vehicle control module 44 so that steering, orientation, velocity, pose and acceleration/deceleration are controlled in a manner to maintain the vehicle along the desired trip path. For example, the vehicle control module may include or cooperate with electrical, mechanical and pneumatic devices in the vehicle to achieve steering and speed control. In other embodiments having various types of propulsion and control mechanisms, a vehicle control module may also include or cooperate with one or more hydraulic, turbine, propeller, control surface, shape changing, and chemical systems or devices. To return to the desired trip path, the vehicle may be controlled to avoid rapid or abrupt correction, and instead to traverse a path to gradually return to the desire trip path at a point further ahead.

The trip path described above can be defined to match path segments that are identical to those used by one or more "reference vehicles" used to acquire the SPR images retrieved from the SPR reference image source 34; however, this is not a general requirement. The method allows global localization data to be determined when there is sufficient overlap in the SPR images for the vehicle's subsurface region with previously obtained SPR reference images. Thus the trip path is not restricted to reference vehicle paths associated with previously obtained SPR image data. Moreover, if the SPR images obtained by the reference vehicles are globally referenced, data obtained in the registration process can be used to generate a global estimate of the position and pose of the vehicle. Consequently, the global estimate can be used to follow any global path defined by a user as long as the global path at least partially overlaps SPR reference images along the full global path.

As described above, previously acquired SPR reference images can be combined, or stitched, to provide more reference image data than that which can be acquired for a single pass of a mobile SPR system. For example, GPR reference image data for a multi-lane highway can be acquired by multiple passes of a mobile GPR system with each pass corresponding to a single lane of the highway. The GPR reference images for the lanes can be seamlessly combined to provide image data for the full width of the highway. Thus a vehicle's navigation system can use the reference images for traveling in any lane and for transitioning between adjacent lanes. Alternatively, only a portion of the width of the highway (e.g., a central lane) may be represented in the stored GPR reference images as long as sufficient overlap exists between the subsurface region of a vehicle and the subsurface region represented in the stored GPR reference images for the highway. The trip path for the vehicle can be defined by a global path without particular reference to the path of the reference vehicles used to obtain the SPR reference images. Alternatively, it may be possible to define a trip path using a lane adjacent to the central lane by maintaining a desired lateral offset between the actual vehicle track and a path associated with the GPR reference images. Any further data collected by vehicles (even while tracking a path) may be used to update the reference image data.

Figure 6:
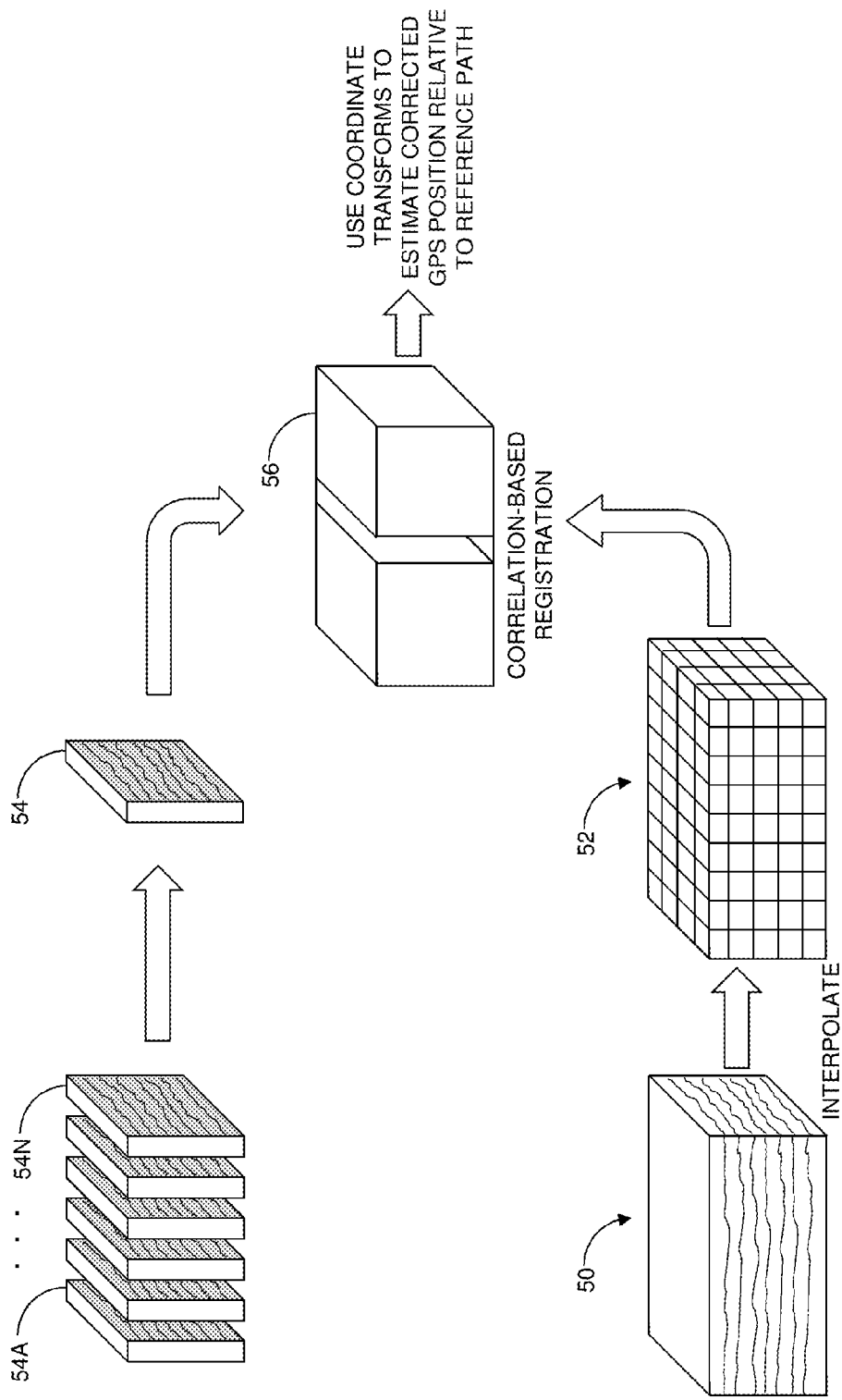
FIG. 6 is a schematic illustration depicting in more detail the processing performed by the radar processor and registration module of FIG. 4.

FIG. 6 is a schematic illustration depicting in more detail the processing performed by the radar processor 38 and the registration module 40 of FIG. 4. Previously obtained SPR image data 50 for the trip path are retrieved and interpolated onto a three-dimensional grid 52. Cross-track SPR image slices 54A to 54N (generally 54) corresponding to multiple array scans are shown with each image slice 54 corresponding a single SPR antenna array scan at a unique position along the vehicle track. A correlation-based registration procedure 56 is applied in latitude, longitude, height, roll and yaw to register the vehicle array scans 54 to the SPR image data 52 interpolated onto the grid. In some embodiments the interpolation occurs in real time prior to registration; however, in other embodiments the interpolation can be performed well in advance of the use of the interpolated data. The location of the SPR antenna array relative to the predefined trip path is calculated from the differences between the vehicle's SPR image data and the interpolated SPR reference image data as determined during the registration procedure.

The correlation-based registration procedure 56 can be performed using data acquired from a single scan of the SPR antenna array. In alternative embodiments, multiple scans are used for registration. For example, data acquired over a period of several seconds can be correlated to multiple scans of previously obtained image data for a larger portion of the subsurface region.

Figure 7:
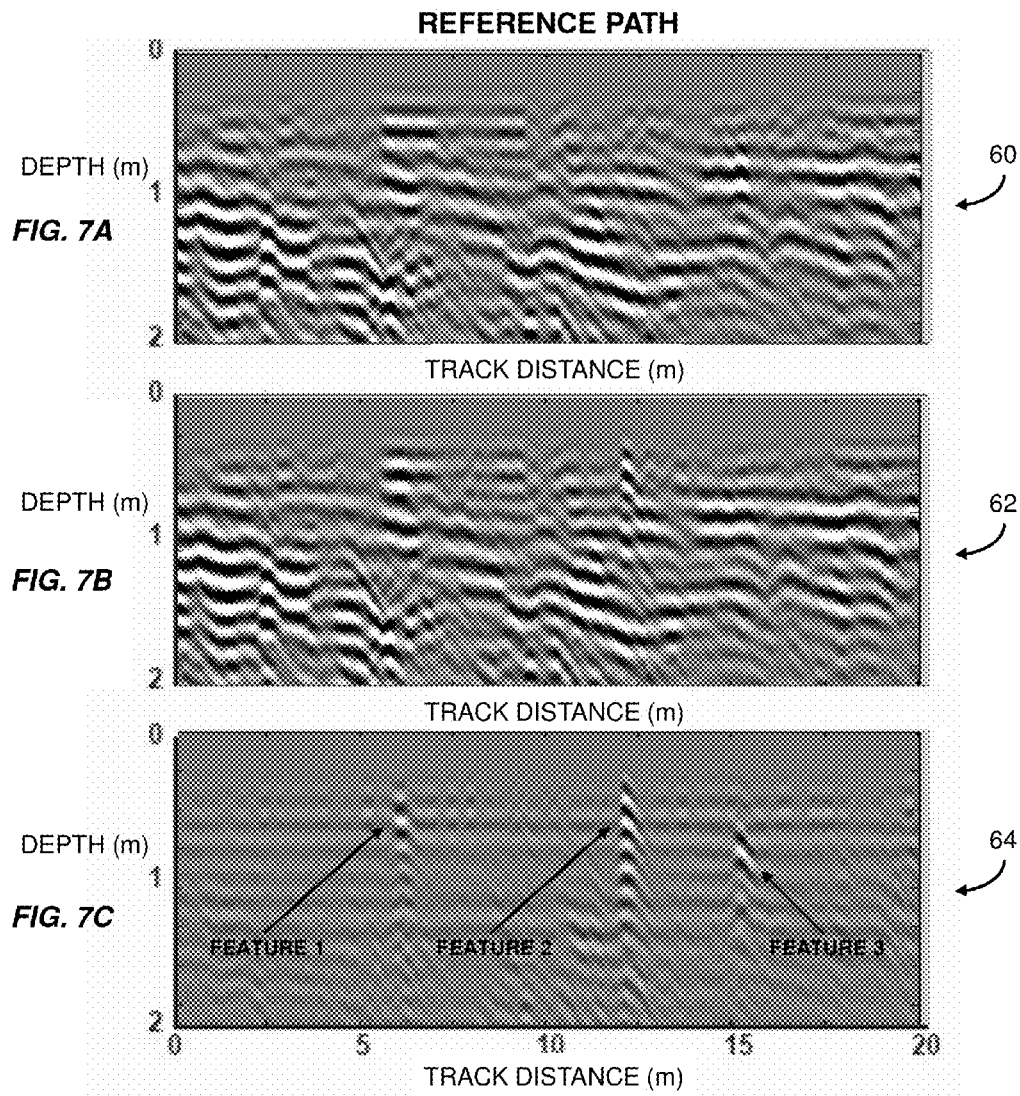
FIG. 7A shows an along-track slice of previously acquired SPR reference images for a trip path.
FIG. 7B shows an along-track slice of SPR images for a vehicle track that is registered to the SPR reference images of FIG. 7A.
FIG. 7C shows a difference image of the two SPR image slices of FIG. 7A and FIG. 7B.

FIGS. 7A and 7B show an along-track slices 60 of previously acquired SPR reference images for a trip path and an along track slice 62 of SPR images for a vehicle track that is registered to the reference path. The reference and registered SPR image slices 60 and 62, respectively, are expected to be substantially identical. FIG. 7C shows a difference image 64 of the two SPR image slices 60 and 62 which indicates indicate features in the subsurface region that developed or were introduced subsequent to acquisition of the SPR data for the reference slice 60. The features may indicate man-made changes such as pipe installations, electrical and drainage channels, and the like. Conversely, features may be due to changes in subsurface conditions that may require repair. Consequently, in some applications this feature data is also used to monitor changes in road conditions or other subsurface conditions.

Figure 8:
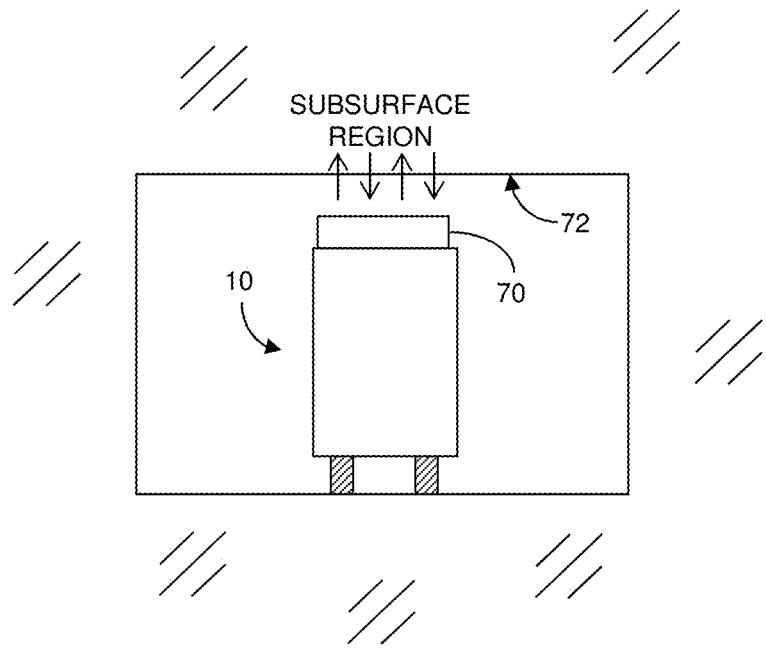
FIG. 8 illustrates a vehicle equipped with a SPR antenna array configured to transmit and receive radar signals in a vertical direction according to an embodiment of the invention.
Figure 9:
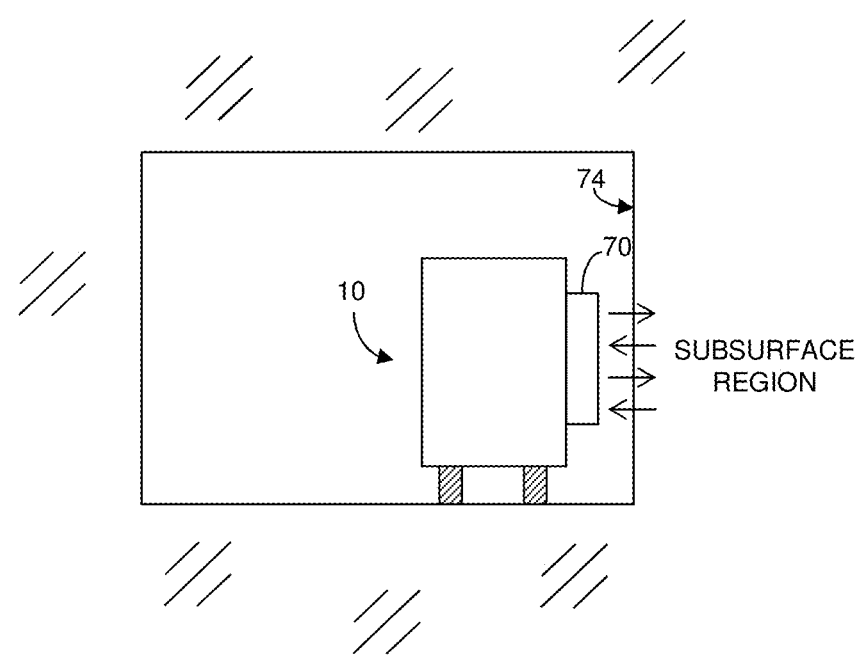
FIG. 9 illustrates a vehicle having a SPR antenna array configured to transmit and receive radar signals in a horizontal direction according to an embodiment of the invention.

Various embodiments described above relate to navigation over road networks and therefore in what generally can be referred to as an outdoor surface environment. Alternatively, a vehicle may be controlled in an indoor environment such as inside a building or within a complex of buildings. The vehicle can navigate hallways, warehouses, manufacturing areas and the like. In other alternatives, a vehicle may be controlled inside structures in regions that may be hazardous to humans, such as in nuclear power facilities and in hospital and research facilities where biohazards may be present. In various embodiments, a SPR is be used to obtain SPR images that include subsurface regions in and/or behind floors, ceilings or walls. Thus the mobile SPR system can be oriented to transmit radar signals and receive radar signals in a preferred direction. For example, FIG. 8 depicts a vehicle 10 traveling into or out from the page of the figure. The vehicle 10 is equipped with a SPR antenna array 70 configured to transmit and receive radar signals in a vertical direction such that the subsurface region for the SPR images includes the region in and behind a building ceiling 72. Conversely, FIG. 9 depicts a vehicle having a SPR antenna array 70 configured to transmit and receive radar signals in a horizontal direction such that the subsurface region for the SPR images includes the region in and behind a vertical wall 74.

Another alternative environment is an underground environment which may include, by way of examples, an underground tunnel or mine passageway. Thus a mining vehicle can be configured with an SPR antenna array configured to transmit and receive in any direction orthogonal to the vehicle direction of travel for which previously acquired SPR reference images are available. Optionally, the mining vehicle can inspect the tunnel or passageway structure for changes or content by determining differences in the SPR images acquired by the vehicle after registration to the corresponding SPR reference images.

Figure 10:
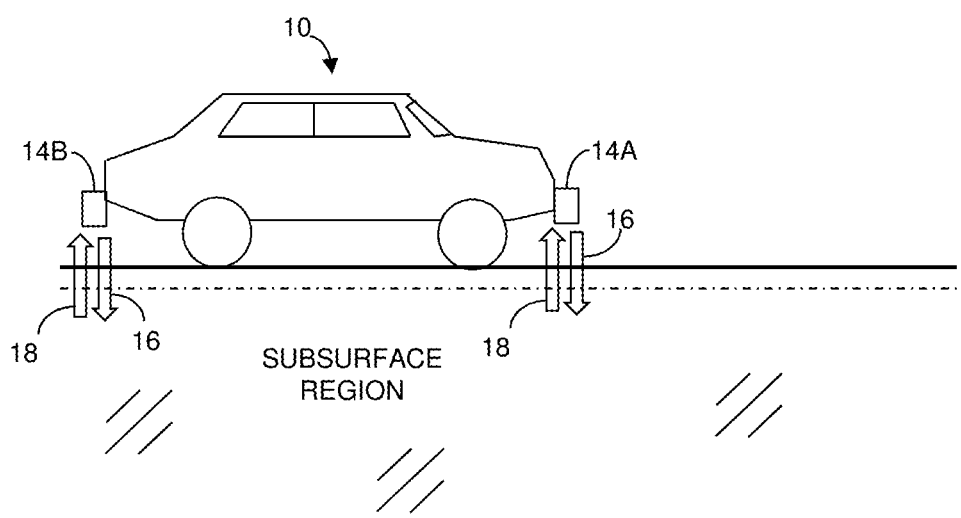
FIG. 10 illustrates a vehicle equipped with two mobile GPR systems according to an embodiment of the invention.

Various embodiments described above relate to the use of previously acquired SPR image data for navigating according to a trip path. FIG. 10 shows a vehicle 10 equipped with two mobile GPR systems. Each GPR system includes a GPR antenna array 14A or 14B affixed to the front or rear of the vehicle 10, respectively. In alternative embodiments one or both of the GPR antenna arrays 14 can be located underneath the vehicle 10 and are not necessarily in a linear configuration. The vehicle 10 can be operated according to an alternative embodiment of the invention in which no previously acquired SPR data are used. A single registration module 40 (see FIG. 4) receives the GPR images acquired by the two GPR systems. Other components of the two GPR systems may be combined for processing efficiency and cost reduction.

The GPR images are compared to determine velocity, acceleration, orientation, angular velocity and angular acceleration for the vehicle 10, and the vehicle 10 may be controlled accordingly. The resulting data can be combined with data acquired by other sensors or filters to better determine the state of the vehicle or the GPR system.

While the invention has been shown and described with reference to specific embodiments, it should be understood by those skilled in the art that various changes in form and detail may be made therein without departing from the spirit and scope of the invention. For example, although various embodiments described above relate to the use of localization data for navigation, it should be appreciated that accurate localization data may be acquired for other purposes such as knowing the global location of a mobile sensor at times of data acquisition.

What is claimed is:

1. A method for localization of a vehicle, the method comprising:
    acquiring surface penetrating radar (SPR) images of a first subsurface region along a vehicle track from a SPR antenna array fixed to the vehicle;
    comparing the SPR images and SPR images previously acquired for a second subsurface region that at least partially overlaps the first subsurface region; and
    determining location data for the vehicle based on location data for the SPR images previously acquired for the second subsurface region.

2. The method of claim 1 wherein the SPR is a ground penetrating radar (GPR), the subsurface regions are underground regions and the SPR images are GPR images.

3. The method of claim 1 wherein the comparing comprises performing an image correlation of the SPR images and SPR images previously acquired for the second subsurface region.

4. The method of claim 1 further comprising processing the location data to determine at least one of velocity, acceleration, orientation, angular velocity and angular acceleration for the vehicle.

5. The method of claim 1 wherein the location data are global location data.

6. The method of claim 1 wherein the SPR images include image data for the surfaces of the first and second subsurface regions.

7. A method for guidance of a vehicle, comprising:
    acquiring from a vehicle surface penetrating radar (SPR) images of a first subsurface region along a vehicle track;
    comparing the SPR images and SPR images previously acquired for a second subsurface region that at least partially overlaps the first subsurface region;
    determining location data for the vehicle based on location data for the SPR images previously acquired for the second subsurface region; and
    guiding the vehicle in response to the determined location data.

8. The method of claim 7 wherein the SPR is a ground penetrating radar (GPR), the subsurface regions are underground regions and the SPR images are GPR images.

9. The method of claim 7 wherein the comparing comprises performing an image correlation of the SPR images and SPR images previously acquired for the second subsurface region.

10. The method of claim 7 further comprising acquiring GPS data along the vehicle track.

11. A vehicle navigation system, comprising:
    a mobile surface penetrating radar (SPR) system configured for attachment to a vehicle and having an array of antenna elements each configured to transmit a radar signal into a first subsurface region and to receive a return radar signal from the first subsurface region;
    a radar processor in communication with the mobile SPR system and configured to generate SPR images of the first subsurface region;
    a registration module in communication with the radar processor and configured to receive SPR images of the first subsurface region, the registration module determining location data for the vehicle based on location data for previously acquired SPR images for a second subsurface region that overlaps at least a portion of the first subsurface region; and a control module in communication with the registration module and configured to generate one or more control signals to guide the movement of the vehicle in response to the location data.

12. The vehicle navigation system of claim 11 wherein the mobile SPR system is a ground penetrating radar (GPR) system, the subsurface regions are underground regions and the SPR images are GPR images.

13. A method for localization of a vehicle, comprising:

acquiring, from a first surface penetrating radar (SPR) system fixed in position relative to a vehicle, a first plurality of SPR images of a subsurface region along a vehicle track;

acquiring, from a second SPR system fixed in position relative to the vehicle, a second plurality of SPR images of at least a portion of the subsurface region along the vehicle track;

comparing the SPR images from the first SPR system and the SPR images from the second SPR system; and determining location data for the vehicle based on the comparison of the SPR images.

14. The method of claim 13 wherein the SPR systems are ground penetrating radar (GPR) systems, the subsurface region is an underground region and the SPR images are GPR images.

15. The method of claim 13 further comprising processing the location data to determine at least one of velocity, acceleration, orientation, angular velocity and angular acceleration for the vehicle.

16. A system for determining location data for a vehicle, comprising:

a first mobile surface penetrating radar (SPR) system having an array of antenna elements each configured to transmit a radar signal into a subsurface region and to receive a return radar signal from the subsurface region, the first SPR system configured to be fixed in a first position relative to a vehicle;

a first radar processor in communication with the first mobile SPR system and configured to generate a SPR image of the subsurface region;

a second mobile SPR system having an array of antenna elements each configured to transmit a radar signal into the subsurface region and to receive a return radar signal from the subsurface region, the second SPR system configured to be fixed in a second position relative to the vehicle and separated from the first mobile SPR system;

a second radar processor in communication with the second mobile SPR system and configured to generate a SPR image of the subsurface region;

and a registration module configured to receive SPR images from the first and second radar processors, the registration module configured to compare the SPR images from the first radar processor and the SPR images from the second radar processor to determine location data for the second mobile SPR system relative to the first mobile SPR system as the vehicle moves along a vehicle track.

17. The method of claim 16 wherein the mobile SPR systems are ground penetrating radar (GPR) systems, the subsurface region is an underground region and the SPR images are GPR images.

18. The system of claim 16 wherein the registration module is configured to determine at least one of velocity, acceleration, orientation, angular velocity and angular acceleration for the vehicle from the location data.

19. The system of claim 16 wherein the first radar processor and the second radar processor are integrated as a single radar processor.

* * * * *